INVENTORS
Watts S. Humphrey, Jr.
Albert H. Ashley
BY F. L. Sullivan
Attorney

Oct. 9, 1962 W. S. HUMPHREY, JR., ET AL 3,058,096

MEMORY DRIVE

Filed Aug. 23, 1957

5 Sheets-Sheet 2

INVENTORS
Watts S. Humphrey Jr.
Albert H. Ashley

BY F. L. Sullivan
Attorney

MEMORY DRIVE

Filed Aug. 23, 1957

TOTAL CATHODE COUNT=270 (FOR X COORDINATE READ AND WRITE)

| CKT | QTY | CATHODES 5998 | CATHODES 5965 | CATHODES 7AK7 |
|---|---|---|---|---|
| ADA | 64 | 128 | 128 | — |
| GG | 1 | 8 | 4 | 2 |
| TOTAL | | 136 | 132 | 2 |

INVENTORS
Watts S. Humphrey Jr.
Albert H. Ashley
BY F. J. Sullivan
Attorney

INVENTORS
Watts S. Humphrey, Jr.
Albert H. Ashley
BY F. D. Sullivan
Attorney

Oct. 9, 1962 W. S. HUMPHREY, JR., ET AL 3,058,096

MEMORY DRIVE

Filed Aug. 23, 1957

5 Sheets-Sheet 5

AD = ARRAY DRIVER AND AMPLIFIER
GG = GATE GENERATOR AND AMPLIFIER
MAR = MEMORY ADDRESS REGISTER

TOTAL CATHODE COUNT = 96
(FOR X COORDINATE READ AND WRITE)

| CKT | QTY | CATHODES | | |
|---|---|---|---|---|
| | | 5998 | 5965 | 5687 |
| ADA | 8 | 16 | — | 32 |
| GGA | 8 | 16 | 32 | — |
| TOTAL | | 32 | 32 | 32 |

INVENTORS
Watts S. Humphrey Jr.
Albert H. Ashley

BY F. J. Sullivan
Attorney

United States Patent Office 3,058,096

Patented Oct. 9, 1962

3,058,096

MEMORY DRIVE

Watts S. Humphrey, Jr., Cochituate, and Albert H. Ashley, Bedford, Mass., assignors, by mesne assignments, to Sylvania Electric Products Inc., Wilmington, Del., a corporation of Delaware Filed Aug. 23, 1957, Ser. No. 679,967
12 Claims. (Cl. 340—166)

This invention is concerned with data processing equipment, and particularly with improvements in memory devices and associated drive circuitry useful in electronic computors.

In electronic digital computors the data to be processed is converted to an arithmetic program which is fed into the computor by a suitable input device such as a typewriter, magnetic tape, punch card system, etc. The arithmetic program thus fed is then stored in a memory apparatus until the appropriate time for it to be processed or enter into an arithmetic calculation. The output of the the arithmetic unit, at different stages of the calculations, is either fed into the memory device associated with the overall program control, or into an independent memory storage, whence it may reenter further arithmetic calculations or be removed from the computor through an output such as punched or electromagnetic tape, a high speed printer, etc. Thus, it is apparent that the memory element plays a very important part in the overall performance of the computer. Its capacity and the speed with which information can be stored within and derived from it are controlling limitations on computer performance.

Memories are of two general types, cyclic and non-cyclic or "random access." Cyclic memories are those which must go through a complete cycle before a given element of information is available for reading, rewriting or alteration. Typical examples of cyclic memories are: sonic or electromagnetic delay lines, magnetic drums and tapes, punched tapes, and some forms of electrostatic storage tubes. Non-cyclic storage or memory systems are characterized by a random access feature. That is to say, information can be written into, derived from, or altered within any part of the memory at any time. Early forms of non-cyclic or random access memories included banks of electromagnetic or electronic relays and some forms of cathode ray or "selectron" tubes. However, a new approach to non-cyclic memories has been made in recent years. The memories developed by the Massachusetts Institute of Technology demonstrate the possibility of a storage system which will permit random and more rapid access and store more elements of information in a more reliable manner than has hitherto been possible for non-cyclic memory devices. These memories utilize a matrix of magnetic cores supported by cross grids of wires to which pulses of electric current are applied. The individual cores located at the intersections of cross wires are activated when current flows in both wires at the intersection. Hence, this type is called a coincident current magnetic core memory. Such memories have been well described in the literature of the art.

J. W. Forrester in an article entitled "Digital Information Storage in Three Dimensions Using Magnetic Cores" in the Journal of Applied Physics (volume 22, p. 44, January 1951) discussed the possibility of utilizing the rectangular hysteresis loop of certain magnetic materials to store binary information. Later (April of 1953), David R. Brown and Ernest Albers-Shoenberg described in an article in "Electronics" (page 146) how certain ferrite material could be used to provide a random access magnetic core memory for a digital computer; and, William N. Pappian in an article on page 194 of "Electronics" for March of 1955 described a ferrite core memory using pulse transformers. He suggested that the cores of the memory be arranged in separate planes, with each plane having (for example) 64 horizontal and 64 vertical rows of cores, resulting in a total of 4096 cores per plane. This makes possible a memory storage of 4096 words or numbers with as many digits or bits per word as there are planes in the system. This memory has many advantageous possibilities; but, like most electronic equipment, its cost, complexity and reliability is affected by the considerable number of vacuum tubes required for its operation.

The principal object of the present invention is to provide an improved memory, and specifically a more satisfactory drive useful in coincident current magnetic core memories and one which will permit more speedy access and materially reduce the vacuum tube requirements of such devices.

With these objectives in mind, the invention is featured by a matrix arrangement of pulse transformers. Each transformer has its secondary connected to a memory coordinate, and has two primary windings, one connected to an array driver and a gate generator in a reading matrix, and the other similarly connected in a writing matrix.

Other objects and applications of the invention will be apparent from the following description of a preferred embodiment and reference to the accompanying drawings, wherein.

Figure 1:
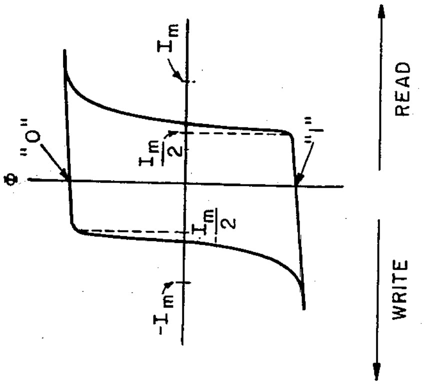
FIG. 1 is a diagrammatic representation of a rectangular hysteresis loop.
Figure 2:
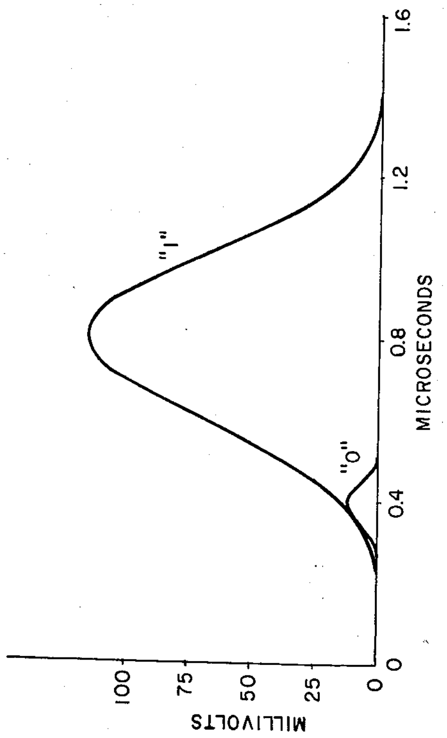
FIG. 2 is a diagrammatic representation of voltage signals read from a magnetic core.
Figure 3:
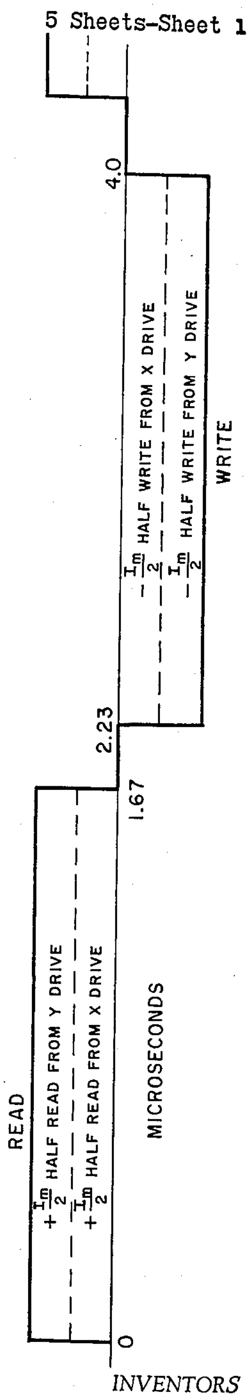
FIG. 3 is a diagrammatic representation of "READ" AND "WRITE" current pulses.

FIGS. 1–3 present diagrammatic representations of some of the features of certain ferrite materials which make them useful in coincident current magnetic core memories. FIG. 1 is the square hysteresis loop of a ferrite core. FIG. 2 demonstrates voltages induced when this core changes from one flux level to another; and FIG. 3 illustrates magnetizing and demagnetizing current pulses which induce a change in state of flux within the core.

The square hysteresis loop of FIG. 1 is characteristic of several memory materials from which memory cores may be made. The flux density of the ferrite material is seen to rise sharply at current value $+Im$ and to fall sharply when the current is decreased to $-Im$. One half of either the magnetizing current $$\left(+\frac{Im}{2}\right)$$

or of the demagnetizing current $$\left(-\frac{Im}{2}\right)$$

has little effect on it.

If the low level of the flux is taken to represent a binary "1" and the high level of a binary "0," the magnetizing and demagnetizing currents can be employed to write-in and read out information which may later be used in the computer to perform binary arithmetic calculations electrically.

Figure 4:
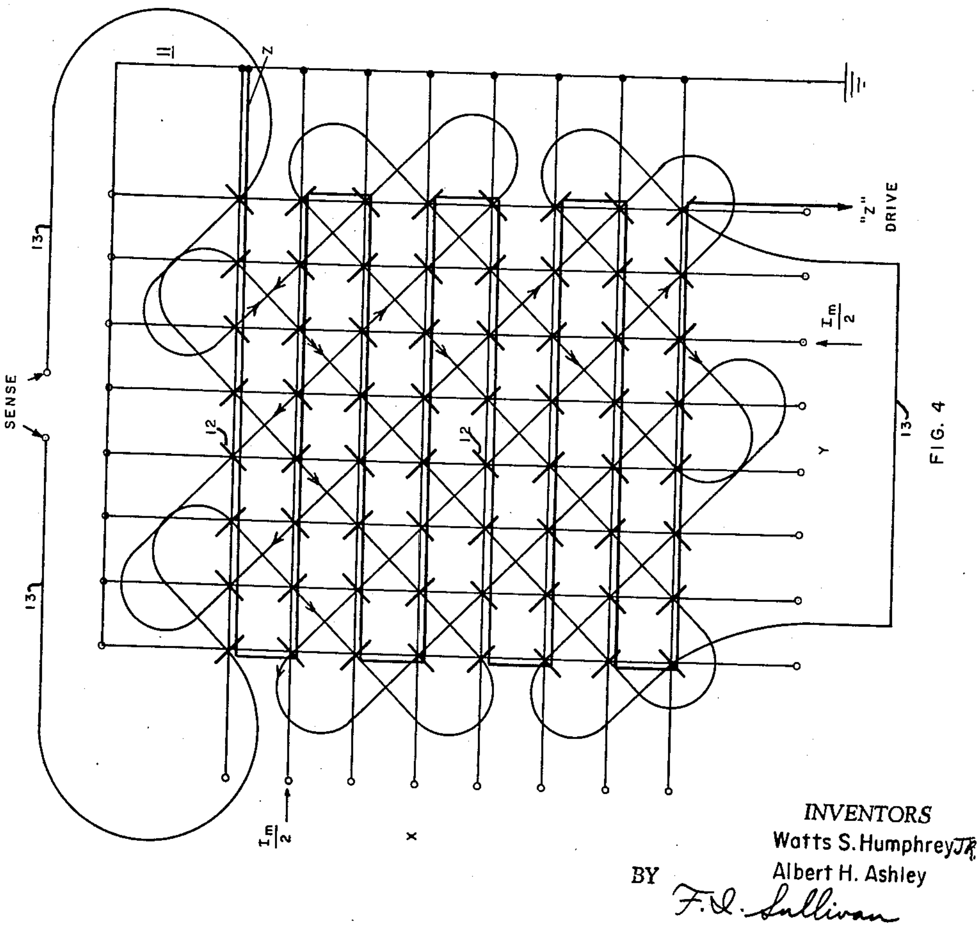
FIG. 4 is a diagrammatic representation of a magnetic memory plane.

FIG. 4 shows electrically conductive wires (X and Y coordinates) threaded through ferrite cores to form a memory plane wherein, by proper pulsing of current through the cores, the desired signals may be "written" and "read." The customary arrangement is a combination of an equal number of horizontal and vertical rows of cores to form a square. There are as many cores in the plane as the word capacity desired for the memory; for example a memory plane with 64 horizontal and 64 vertical rows of cores can store 64×64 or 4096 words. The number of bits or digits per word is determined by the number of parallel planes within the memory.

The individual cores have horizontal (X) and vertical (Y) coordinates in the form of conductive wires threaded through them to form a matrix with the cores located at the intersection of the coordinates. Thus, referring to FIG. 4, a memory plane 11 comprises a plurality of magnetic cores 12 each in the form of a toroid surrounding the intersection of horizontal and vertical coordinates X and Y. A sensing wire 13 and another driving wire Z are also threaded through the cores.

With this arrangement $$\frac{Im}{2}$$

pulses are fed to one of the X and one of the Y coordinates. This results in a half-read or half-write signal (depending on the polarity of the pulse) in each of the cores along the selected coordinates and a full read or write pulse in the core within which the selected coordinates intersect.

Figure 5:
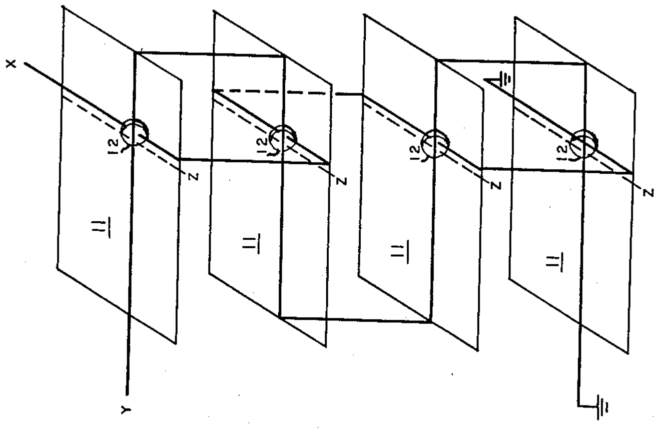
FIG. 5 is a diagrammatic representation of a group of memory planes.

FIG. 5 shows a plurality of planes 11 arranged in a complete memory assembly. The X and Y coordinate drives are connected from one plane to another so that all of the planes in the memory are driven simultaneously. The Z drive, however, and the sense wire 13, are independent for each plane.

Information is stored or written into the memory by applying a $$-\frac{Im}{2}$$

write pulse to an X and a Y coordinate. This presents half write signals to all the cores along the selected coordinates in all of the planes of the memory. These pulses are not of sufficient magnitude (see FIG. 1) to affect the flux density of the core. However, a full write signal is applied to the core within which the coordinates intersect in each plane of the memory. This has the effect of writing a "1" in every bit or digit of the word associated with the intersection of these particular coordinates. When a "0" instead of a "1" is desired for any bit within the word, the Z drive of the plane associated with that particular bit is fed a half-read pulse which cancels one half of the full write and thereby limits the effective magnetizing current pulse to $$-\frac{Im}{2}$$

This is insufficient to change the flux density to "1" and consequently a "0" results (see FIG. 1). The core is always at "0" level at the start of the writing cycle because the current pulses involved in reading leave the core in that condition.

Reading is accomplished by feeding $$+\frac{Im}{2}$$

pulses to both the X and Y coordinates. This produces a full read in the core at the intersection of the selected coordinates and raises the flux density of the core to the higher "0" level.

The "read" signal for each bit within a word is derived from the sensing wire 13 of the memory plane associated with the bit concerned. These sensing wires 13 are threaded through each core of their particular plane. The $$+\frac{Im}{2}$$

or one half read pulses have no effect on the flux condition of the core but the full read (+I*m*) at the intersection of the corrdinates causes the flux density to switch to the higher "0" state. Such a change induces an output voltage signal (see FIG. 2) in sense wire 13 which is ten or more times the amplitude of the voltage induced when a zero core is pulsed.

Figures 6, 9:
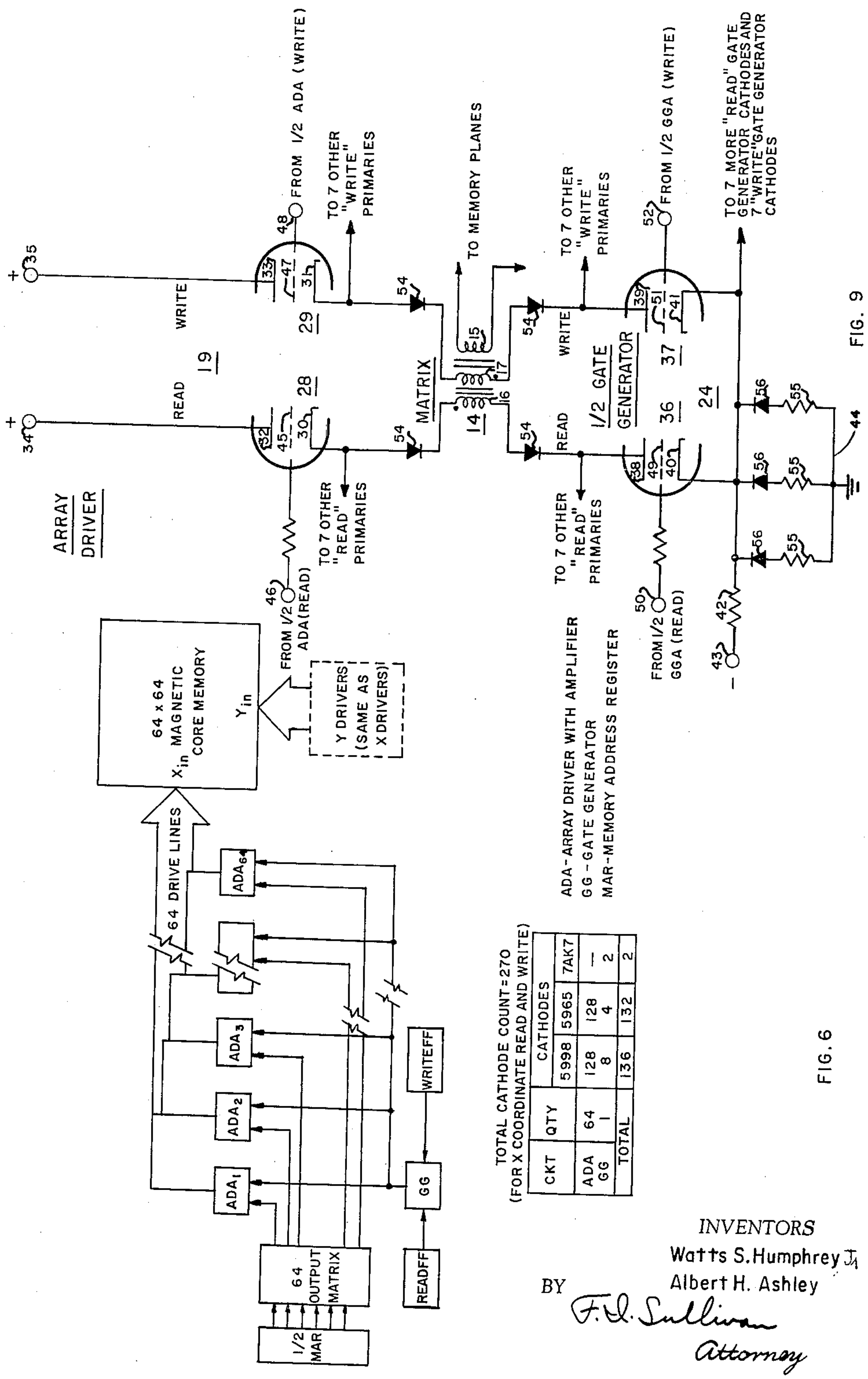
FIG. 6 is a block diagram of a prior art magnetic core memory drive.

FIG. 6 is a block diagram of the magnetic core memory and associated drive mechanism suggested in the "Electronics" (March 1955) article referred to above. This particular memory has 64 X and 64 Y coordinates. Both coordinates are driven by similar circuitry, hence only the X drive is shown. This drive is controlled by one half of the memory address register operating through a 64 output matrix. The individual outputs of this matrix are each fed to an array driver and amplifier combination connected to one of each of the 64 coordinates. A single matrix and 64 array drivers for reading are indicated in the figure. An additional 64 drivers (not indicated) are required for writing. A single gate generator, cyclically controlled by reading and writing flip-flop circuits, is connected in common to all of the array drivers. Thus, as each output of the memory address register matrix is selectively pulsed, the particular coordinate with which it is associated will deliver a $$+\frac{Im}{2} \text{ or } -\frac{Im}{2}$$

pulse, as dictated by the gate generator.

Figure 7:
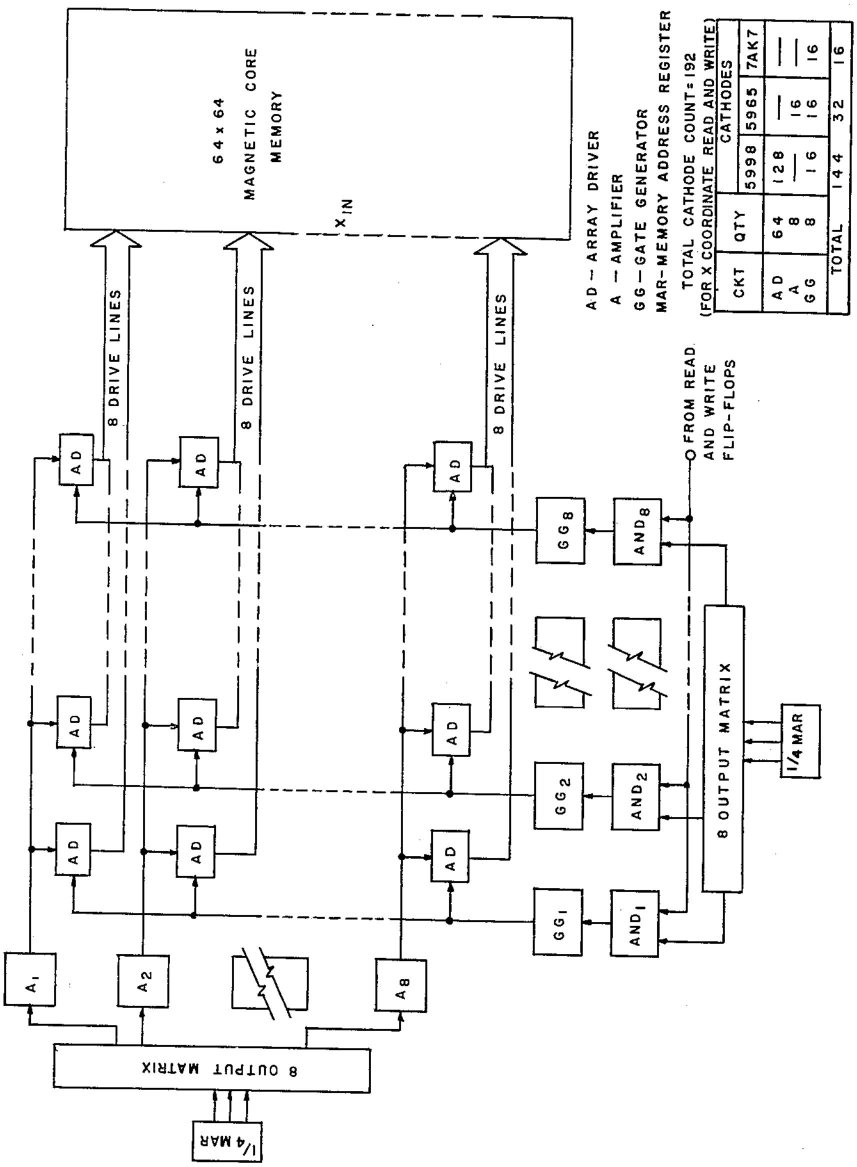
FIG. 7 is a block diagram of a suggested improvement of the memory drive of FIG. 6.

Such a circuit requires a considerable number of electron tubes, some of them very bulky and expensive twin triode drivers of the 5998 type and a number of associated 5965 and 7AK7 amplifiers. As shown in the schedule which accompanies FIG. 6, the driving circuitry for only one set of coordinates requires 270 cathodes to accomplish reading and writing. (Cathode, instead of tube, count is more satisfactory for purposes of comparing drive systems because many duo-triodes are involved.) Such an excessive number of cathodes led to the proposal in the reference cited that the memory be driven in the manner shown in the block diagram of FIG. 7.

In this arrangement one quarter of the memory address register is fed through an eight output matrix to drive eight amplifiers. Each amplifier, in turn, drives eight array drivers. The net result is a total of 64 array drivers individually connected to the 64 memory coordinates. Selection among the array drivers is accomplished by a matrix arrangement of the eight amplifiers and eight gate generators.

The gate generators are controlled from another quarter of the memory address register, also through an eight output matrix. Each matrix output is fed to an AND gate having another input from the read and write flip-flops. Thus, the eight gate generators are selectively pulsed, and in combination with selective pulsing of the eight array driver amplifiers by the memory address register, select and pulse the 64 coordinates individually as desired.

This proposed modification has the merit of economy of amplifying tubes but does not cut down on the bulky and expensive twin triode 5998 array drivers, and actually increases the number of gate generators to result in a net increase of this type of tube. The circuitry required has a total cathode count of 192.

Figure 8:
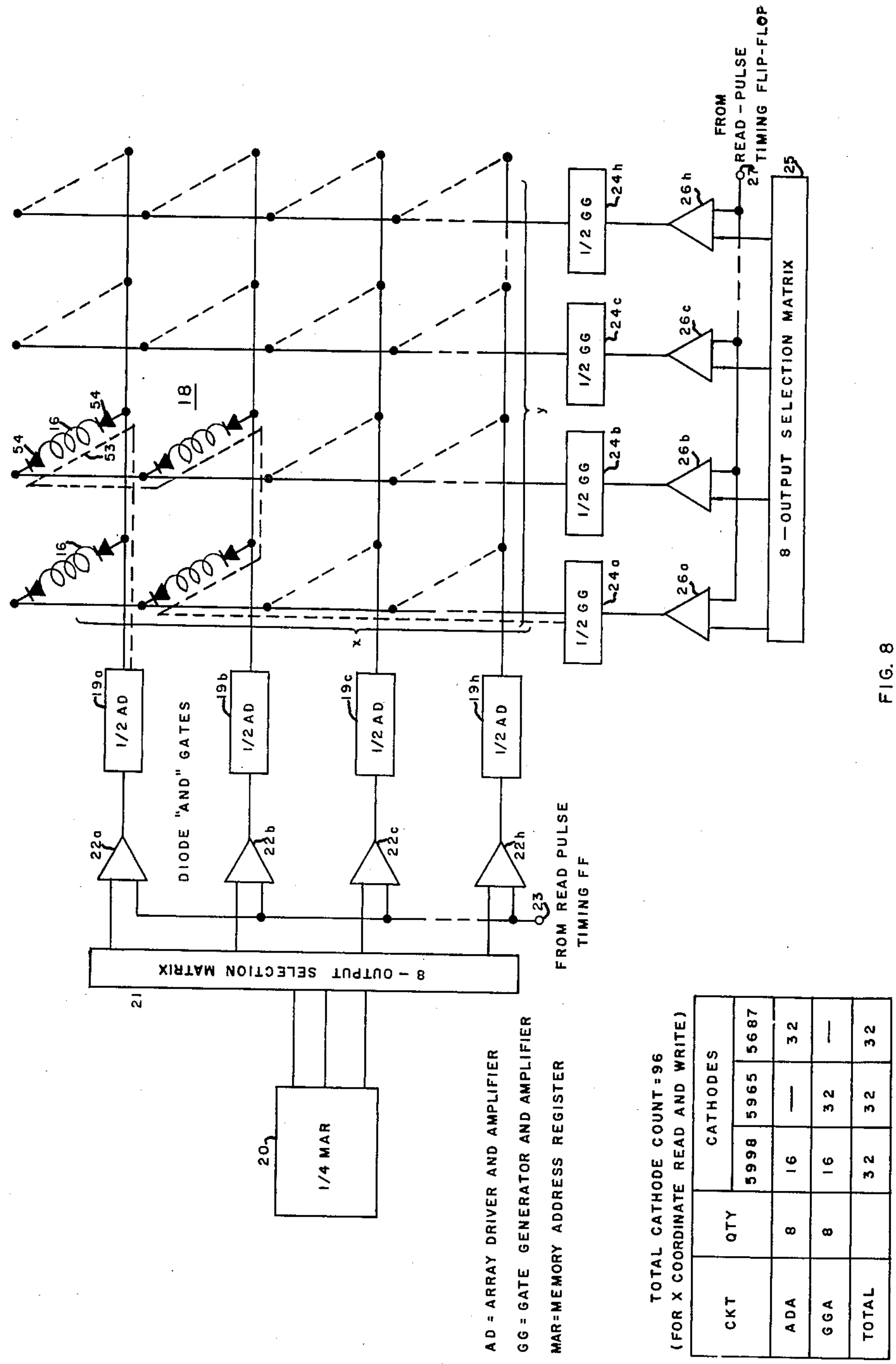
FIG. 8 is a representation, partly diagrammatic and partly schematic, of the memory drive of the present invention; and, FIG. 9 is a schematic diagram of an array driver and gate generator as used in the present invention.

A driving circuit for the X coordinates of a magnetic core memory in accordance with the present invention is shown in FIGS. 8 and 9. It features a matrix arrangement of pulse transformers 14 having single secondary windings 15 and two oppositely wound primary windings 16 and 17.

As shown in FIG. 8, the transformers are arranged in a matrix 18 with one set of the primary windings 16 connected across the outputs of eight array drivers and eight gate generators which are controlled by the memory address register and the "read" flip-flop. The other set of oppositely wound primaries (not shown) is connected to a similar eight by eight matrix of array drivers and gate generators controlled by the "write" flip-flop and the memory address register.

The array drivers 19*a–h* are selectively operated by one quarter of the memory address register 20 feeding through an eight output selection matrix 21 connected to eight AND gates 22*a–h* each of which is also connected, through terminal 23, to the read pulse timing flip-flop circuit. Each AND gate 22 is connected to an array driver 19 which is, in turn, connected to an $x$ coordinate of the matrix arrangement of transformer primaries 16 and drives all of the transformers connected to its particular coordinate.

The gate generators 24*a–h* are similarly controlled by another quarter of the memory address register (not shown) through an eight output matrix 25 and eight AND gates 26*a–h* also connected, through terminal 27, to the read pulse timing flip-flop circuit. Each AND gate 26 controls a gate generator 24 connected to a $y$ coordinate of transformer primaries 16. Thus, transformer driving matrix comprises horizontal and vertical rows of transformers having their reading primaries 16 connected in coordinate groups to an array driver for each horizontal row and a gate generator for each vertical row. Four horizontal and four vertical rows are shown for a matrix of 16, and an $8\times8$ matrix of 64 is discussed for purposes of comparison with the prior art devices considered, but it is to be understood that other matrix combinations may be used. To drive 64 coordinates, this particular arrangement of pulse transformers results in a considerable saving of 5998 driving tubes and (including amplifiers 5965 and 5687) a sizable cathode count reduction over the methods previously described to 96.

FIG. 9 shows an array driver 19 and a gate generator 24 as employed in the invention. The array driver is divided into a reading section 28 and a writing section 29, with the cathode 30 of the reading section connected to one side of transformer primary 16 and the cathode 31 of the writing section similarly connected to an oppositely wound primary winding 17. The plates 32 and 33 of sections 28 and 29 are connected to positive voltage sources 34 and 35, respectively.

The gate generator 24, also comprises a reading section 36 and a writing section 37. The reading section 36 has its plate 38 connected to primary 16, and the writing section 37 has its plate 39 connected to primary 17. Both cathodes 40 and 41 of the read and write sections, respectively, are connected in common through a resistor 42 to a negative voltage terminal 43, and through a resistance network 44 to ground.

The control grid 45 of the read section 28 of array driver 19 is connected, via terminal 46, through an AND gate 22 and selecting matrix 21 to one quarter of the memory address register 20; and the control grid 47 of the write section 29 is similarly connected, via terminal 48, through a similar AND gate (not shown) to matrix 21. The gate generator 24 has the control grid 49 of its reading section 36 connected, via terminal 50, through AND gate 26 and selecting matrix 25, to a different quarter of the memory address register; and, the control grid 51 of its writing section 37 connected, via terminal 52 through another AND gate (also not shown) to selecting matrix 25.

Thus, array driver tube section 28 and gate tube section 36 serve as current switches which are serially connected to either side of transformer primary winding 16, and simultaneous signals at terminals 46 and 50 cause a current to flow through primary 16 of pulse transformer 14. Similarly, sections 29 and 37 serve as switches for oppositely wound primary 17 so that simultaneous signals at terminals 48 and 52 provide a pulse of opposite polarity in transformer 14.

In the 64 coordinate memory discussed for purposes of example and comparison, eight array drivers 19*a–h*, each having a reading section 28 and a writing section 29, and eight gate generators 24*a–h*, each also having a reading section 36 and a writing section 37, are employed. Each array driver section is connected to a different row of eight transformer primaries; and each gate generator is similarly connected to a different column of eight primaries. A signal applied to the control grid of either an array driver or a gate generator renders the tube section concerned, and its eight associated transformers, potentially conductive, but current will flow to pulse only the single transformer having a primary winding connected to both an array driver and a gate generator simultaneously rendered potentially conductive by voltage signals on their control grids. In order to prevent "sneak paths" such as that shown in dotted lines (53) in FIG. 8 from permitting additional transformers to be pulsed, isolating diodes 54 are employed on either side of both primary windings of each transformer 14. (Diode type IN485 is suitable for this purpose.)

The memory drive of the invention, shown in FIGS. 8 and 9, and hitherto described in general concept, functions in the following manner to produce positive reading and negative writing pulses in the output secondary windings 15 of transformers 14 thereby to pulse a selected X and a selected Y coordinate from the 64 X and 64 Y coordinates, and either magnetize or demagnetize the individual cores 12 located at the intersections of the selected coordinates.

The memory address register 20, which is conventional in design and operation, has a twelve flip-flop output. One half of the output controls the X coordinates and the other half the Y coordinates. Within each half, one quarter of the register controls the array drivers for both reading and writing operations and the other quarter similarly controls the gate generators.

Thus, one quarter of the memory address register 20 controls the reading and writing of the X coordinate. This quarter comprises three flip-flops which are fed into a three input-eight output matrix 21. The eight outputs of the matrix are fed to eight individual AND gates 22 connected to read sections 28 of array drivers 19 and eight other AND gates (not shown) connected to write sections 29. The central control of the computer dictates whether a reading or a writing operation is to be conducted by pulsing the reading flip-flop connected to terminal 23 to the AND gates 22, or the writing flip-flop (not shown) which controls the other AND gates connected to the writing sections.

Simultaneously, with this selective operation of matrix 21 and its associated AND gates 22 and array drivers 19, the other quarter in the half register which controls the X coordinates feeds three flip-flop outputs through the eight output matrix 25 to eight AND gates 26 which are connected to reading sections 36 of gate generators 24, or to eight other AND gates (not shown) connected to writing sections 37. Again, central computer control dictates whether the reading flip-flop activates the AND gates 26 or the writing flip-flop activates the other gates (not shown), depending upon whether a reading or writing operation is desired.

When the memory address register 20 selectively pulses matrices 21 and 25 in such a way that a signal is applied to the control grid 45 of an array driver at the same time a signal is applied to the control grid 49 of a gate generator connected to the same transformer primary 16, current flows from terminal 34 through reading section 28 of array driver 19, the primary winding 16 of transformer 14, reading section 36 of gate generator 24 and resistor 42 to the negative reference voltage at terminal 43, thus providing a positive current pulse, via transformer 14 to the selected X coordinate.

The network 44 which comprises three resistors 55, parallel with each other and each in series with a diode 56, serves to stabilize the current through the series connected driver 19 and generator 24 by regulating the bias on the cathodes 40, 41, etc. in accordance with the current through resistor 42. Three resistors and three diodes are used in the parallel arrangement shown to provide sufficient current capability in the diodes.

The circuit has been described as operated to drive the X coordinates for a reading operation. The writing operation is the same except that the AND gates 22 which pass reading pulses are inactivated and the writing gates (not shown) are activated by a pulse from the writing flip-flop. This cuts off the reading sections of the array drivers and the gate generators and causes writing sections 29 and 37 respectively of the drivers 19 and generators 24 to conduct and current to flow through the other primary 17 to drive transformer 14. As explained previously, primary 17 is wound in the opposite direction from primary 16 so that while current through primary 16 provides a positive output pulse to the coordinates, current through the winding 17 provides a negative pulse.

The drive for the Y coordinates is the same as that described for their X equivalents. Consequently, it will not be described in detail. Also, detailed description is not given of the memory address register referred to and its associated output matrix and flip-flop circuitry because they are conventional in operation and well known to those skilled in the art.

Although the invention has been described as applied, in a preferred embodiment, to a coincident current magnetic core memory device having 64 X and 64 Y coordinates, this is by way of illustration and not limitation. It may be used with other numbers of coordinates, other types of storage devices, and for other related purposes. Its scope is limited only by the following claims.

What is claimed is:

1. In an electronic signal system wherein electric energy pulses of different character are selectively applied to different ones of a plurality of conductors: a plurality of transformers each having at least one secondary winding connected to one of said conductors and at least first and second primary windings; and, a matrix system for selectively energizing said primary windings said system including first and second pluralities of $x$-coordinate conductors, first and second pluralities of $y$-coordinate conductors, means connecting one end of each of different group of said first primary windings to one of said first $x$-coordinate conductors and the other end of each of said first primary windings to one of said first $y$-coordinate conductors, and means connecting one end of each of said different groups of said second primary windings to one of said second $x$-coordinate conductors and the other end of each of said second primary windings to one of said second $y$-coordinate conductors.

2. In an electronic system wherein a plurality of magnetic devices are linked by individual conductors selectively transmitting positive and negative pulses of electric energy: a plurality of transformers each having at least one secondary winding connected to one of said conductors and at least first and second primary windings; first and second matrix subsystems for selectively energizing said first and second primary windings each including a plurality of $x$-coordinate conductors, a plurality of $y$-coordinate conductors, and semiconductor means connecting one end of each of its corresponding primary windings to one of said $x$-coordinate conductors and the other end of each of said corresponding primary windings to one of said $y$-coordinate conductors in a matrix configuration.

3. The invention according to claim 2 wherein said first and second primary windings are wound in opposite directions.

4. The invention according to claim 3 wherein a separate switching device is connected in series circuit with each of said $x$- and $y$-coordinate conductors.

5. The invention according to claim 4 wherein said switching devices are electron discharge devices having at least anode and cathode electrodes and one end of each of said primary windings is connected by its respective $x$-coordinate conductor to the cathode of one switching device and by its respective $y$-coordinate conductor to the anode of another switching device.

6. The invention according to claim 5 wherein said switching devices each include a control electrode and means is provided for selectively energizing the control electrode of a switching device connected to an $x$-coordinate conductor and the control electrode of a switching device connected to a $y$-coordinate conductor, thereby selectively energizing a selected one of said primary windings.

7. For an electronic signal system having a plurality of magnetic devices linked by electric current conductors and capable of switching between first and second stable states of magnetic remanence in response to current pulses of first and second opposite polarities, respectively, through said conductors, means for providing said switching pulses comprising: a plurality of pulse transformers, each having a secondary winding connected to one of said conductors and first and second oppositely wound primary windings; a plurality of first and second $x$-coordinate conductors; a plurality of first and second $y$-coordinate conductors; semiconductor means connecting one end of each of different groups of said first primary windings to corresponding separate ones of said first $x$-coordinate conductors and the other end of each of said groups of first primary windings in similar manner to separate ones of said first $y$-coordinate conductors; semiconductor means connecting one end of each of different groups of said second primary windings to corresponding separate ones of said second $x$-coordinate conductors, whereby when current is caused to flow through a given one of said primaries no current will flow in any other one of said primaries and the other end of each of said second primary windings similarly to separate ones of said second $y$-coordinate conductors; and means for selectively transmitting current pulses through said first and second $x$- and $y$-coordinate conductors.

8. A magnetic core memory system comprising: a plurality of magnetic cores capable of switching between first and second stable states of magnetic remanence in response to current pulses of opposite polarity through conductors linking said cores; a plurality of conductors so linking said cores; a plurality of pulse transformers, each having a secondary winding connected to one of said conductors and first and second oppositely wound primary windings; a plurality of first and second $x$-coordinate conductors; a plurality of first and second $y$-coordinate conductors; semiconductor means connecting one end of each of different groups of said first primary windings to a separate one of said first $x$-coordinate conductors and the other end of each of said groups of first primary windings in similar manner to separate ones of said $y$-coordinate conductors; semiconductor means connecting one end of each of different groups of said second primary windings to a separate one of said second $x$-coordinate conductors and the other end of each of said second primary windings similarly to separate ones of said second $y$-coordinate conductors; and, switching means for transmitting current pulses through selected combinations of $x$- and $y$-coordinate conductors.

9. For selectively applying positive and negative current signals to any one of a plurality of output circuits, a drive circuit including: a transformer for each output circuit, each of said transformers having a secondary winding and first and second primary windings; means connecting said first and second windings, respectively, into first and second matrices of x- and y-coordinate conductors; each of said first primary windings being connected between an x and a y conductor of the first matrix at their intersection and each of said second primary windings being similarly connected between an x and a y conductor of the second matrix; a separate individual switching element connected in series circuit with each individual x and y conductor of each matrix; and, means for selectively actuating a pair of switching elements connected to an x and a y conductor of any selected one of the matrices to allow current to flow through the primary winding at the intersection of those conductors and thereby induce an output signal in the secondary winding of the selected transformer, the first and second primary windings of each transformer being so arranged as to induce currents in opposite senses in the secondary winding.

10. A drive circuit according to claim 9 in which the means for actuating the switching elements include: an x-coordinate selection matrix connected to the x-coordinate switching elements of the first and second matrices, a y-coordinate selection matrix connected to the y-coordinate switching elements of the first and second matrices; and, means for selectively applying an actuating signal to the x- and y-coordinate switching elements of the first and second matrices.

11. A drive circuit as claimed in claim 10 in which pairs of switching elements consisting of one of the x- or y-coordinate switching elements of the first matrix and one of the x- or y-coordinate switching elements, respectively, of the second matrix consist of double triodes.

12. A drive circuit according to claim 11 including an isolating diode connected in series with each primary winding between the x- and y-coordinate conductors to which it is connected.

References Cited in the file of this patent

UNITED STATES PATENTS

| | | |
|---|---|---|
| 2,729,808 | Auerbach et al. | Jan. 3, 1956 |
| 2,734,187 | Rajchman | Feb. 7, 1956 |
| 2,849,703 | Bindon et al. | Aug. 26, 1958 |
| 2,862,190 | Schumann | Nov. 25, 1958 |
| 2,913,706 | Thorensen et al. | Nov. 17, 1959 |
| 2,931,017 | Bonn et al. | Mar. 29, 1960 |
| 2,932,008 | Hoberg | Apr. 5, 1960 |
| 2,932,011 | Einhorn et al. | Apr. 5, 1960 |

FOREIGN PATENTS

| | | |
|---|---|---|
| 769,384 | Great Britain | Mar. 6, 1957 |

OTHER REFERENCES

"Thesis on Magnetic Cores," by M. K. Haynes, pp. 21–28, 36–45, December 28, 1960.

Disclaimer 3,058,096.—*Watts S. Humphrey, Jr.*, Cochituate, and *Albert H. Ashley*, Bedford, Mass. MEMORY DRIVE. Patent dated Oct. 9, 1962. Disclaimer filed March 26, 1964, by the assignee, *Sylvania Electric Products Inc.*

Hereby enters this disclaimer to claims 1, 9, 10, 11 and 12 of said patent.

[*Official Gazette June 16, 1964.*]